Aug. 12, 1958 J. A. SAUCEDO 2,847,568

DISTANCE DIGITAL DISPLAY OR THE LIKE

Filed Oct. 24, 1955

JULIAN A. SAUCEDO

*INVENTOR.*

BY [signature]

HIS ATTORNEY

United States Patent Office 2,847,568

Patented Aug. 12, 1958

2,847,568

DISTANCE DIGITAL DISPLAY OR THE LIKE

Julian A. Saucedo, Covina, Calif., assignor to Hoffman Electronics Corporation, a corporation of California Application October 24, 1955, Serial No. 542,208

2 Claims. (Cl. 250—27)

This invention is related to distance digital displays and, more particularly, to a new and improved distance digital display which will exhibit a high degree of accuracy and reliability and yet be characterized by reduced physical size and complexity.

In the past, many types of digital display systems adapted to present range or distance information, for example, have been developed. Distance digital display systems as are currently in use suffer from certain deficiencies, such as insufficient accuracy, low reliability, and cumbersome physical size. There has been a great need to reduce the size and complexity of digital range displays without sacrificing, but rather enhancing accuracy and reliability.

Therefore, it is an object of the present invention to provide a new and useful range or distance digital display system.

It is a further object of the present invention to provide a distance digital display system which will be relatively compact, of simple design, and yet which will insure optimum reliability and performance.

According to the present invention, an internal or external source of trigger pulses activates a synchronized blocking oscillator which feeds into two circuit channels. One channel produces properly shaped pulses to drive a neon tube counter. The remaining channel is a delay channel which operates to produce pulse means for terminating, after a discrete time interval, the pulse train feeding into the counter; in addition, the aforementioned pulse means simultaneously activates a reset circuit so as to reset to zero the associated counter.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
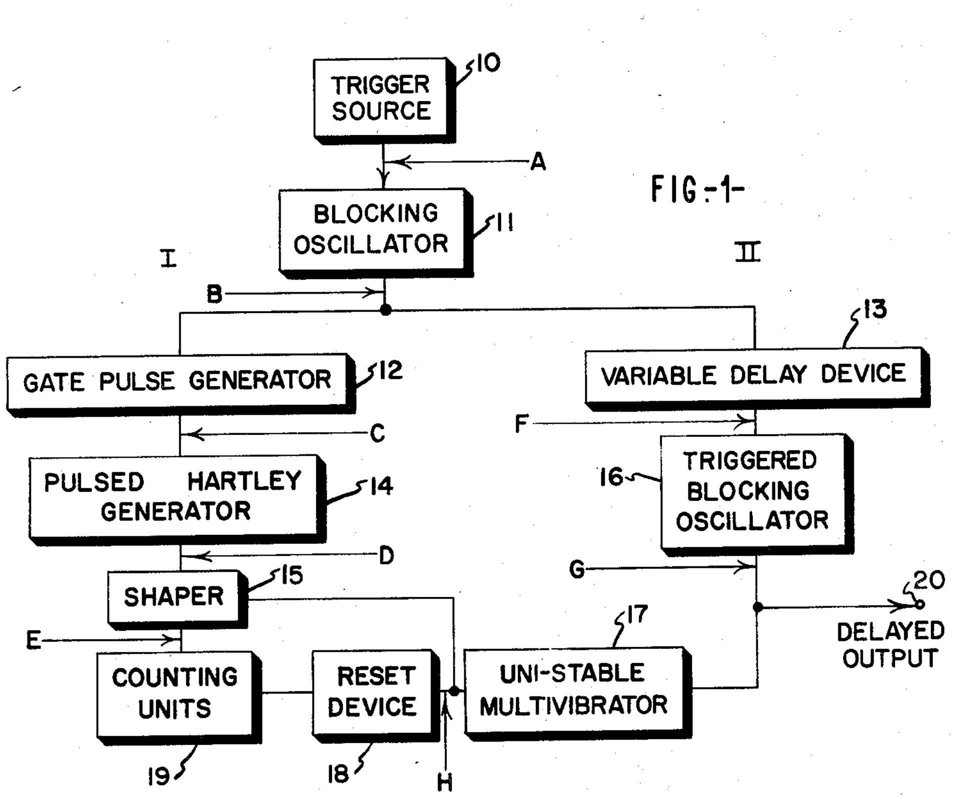
Figure 1 is a schematic diagram in block form of a distance digital display according to the present invention.

In Figure 1, trigger source 10 is coupled through blocking oscillator 11 to gate pulse generator 12 and also to variable delay device 13. Gate pulse generator 12 comprises the first stage of channel I, whereas variable delay device 13 comprises the first stage of delay channel II. Trigger source 10 may be internal or external to the system. Blocking oscillator 11 is heavily biased for nonconduction in the absence of pulses from trigger source 10. Device 13 comprises a conventional delay line or other appropriate delay device and may be chosen to be either manually or automatically variable. Gate pulse generator 12 of channel I is coupled through pulsed Hartley oscillator 14 to shaper 15. Variable delay device 13 is coupled through blocking oscillator 16 to unistable multivibrator 17. Multivibrator 17 is coupled to shaper 15 and also to reset device 18. Shaper 15 and reset device 18 are both coupled to counting unit 19. The delayed output signal may be taken from terminal 20 as is shown. Reset device 18 may simply consist of a thyratron tube circuit in which the tube has a relatively large discharge current rating, so as to be capable of resetting counting units 19 to their zero position. The counting units themselves may be constituted by conventional neon tube ring counters, as they are known to the industry. Such a counter as might be employed is illustrated in Patent No. 2,646,534, issued to John C. Manley and entitled "Electronic Counter."

Figure 2:
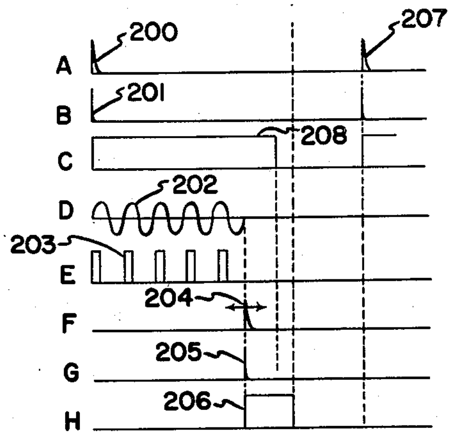
Figure 2 is a diagrammatic presentation of wave forms as found at various points in the circuit of Figure 1.

The various wave forms shown in Figure 2 are those which exist at various points in the circuit of Figure 1. For sake of convenience, Figures 1 and 2 shall be discussed concurrently.

Accordingly, the distance digital display shown in block diagram in Figure 1 operates as follows. Pulse 200 from trigger source 10, as sampled at point A in Figure 1 (see point A in Figure 2), triggers heavily biased blocking oscillator 11 which itself produces a sharp output pulse having an extremely rapid and accurate rise time. See pulse 201 at point B in Figure 2. Pulse 201 from blocking oscillator 11 is fed to generator 12 which generates a gate pulse of sufficient pulse width to permit oscillator 14 to generate a sinusoidal signal of sufficiently long duration. The extent of this duration shall be mentioned later in greater detail. The sinusoidal signal from oscillator 14 is fed into shaper 15 the output signal from which constitutes a square wave pulse train having a pulse repetition frequency equal to the signal frequency of sinusoidal signal 202 from oscillator 14 at point D. Let the several square wave pulses at point E from shaper 15 be termed pulses 203. The time interval between successive rise points of pulses 203 is of course determined by the period of signal 202; therefore, this period should be related to an integral distance, say for example, one mile of range to be detected. Pulse 201 at point B from blocking oscillator 11 is also fed through variable delay device 13 to triggered blocking oscillator 16. The delayed pulse is accordingly shaped by triggered oscillator 16 and is subsequently routed to unistable multivibrator 17 which in turn develops a negative square wave pulse to cut off shaper 15. Hence, the delay exhibited by delay device 13 will determine that point in time at which signal 202 at D will terminate. Termination of signal 202 will of course determine the number of pulses in the pulse train at point E and, hence, the number of counts registered by counting units 19. Multivibrator 17 also actuates reset device 18 so as to restore counting units 19 to their original zero condition. It is to be noted that by varying the delay of device 13 one may determine the time occurrence of pulse 204 at point F in the circuit of Figure 1. The determinaion time-wise of pulse 204 will likewise determine the time occurrence of pulses 205 and 206. Upon the occurrence of a second pulse 207 at A from trigger source 10, the cycle will be repeated.

From the above discussion, it is clearly seen that the pulse width of pulse 208 at point C from gate pulse generator 12 must at all times be greater than the time delay impressed upon pulse 201 by variable delay device 13, yet, the width of pulse 208 must not be so great as to extend into the time interval where a second pulse at A might occur.

In actual fact, the actuation speed of the counters will be so great that only the zeros and the range will be indicated visually to the observer. Thus, when the correct digital range is observed, it will be known that the time delay between a pulse at trigger source 10 and a pulse at delay output terminal 20 will be correct.

It might be thought that a crystal controlled oscillator might perform the function of stage 14 best by reason of its inherent qualities of stability. However, it has been discovered through experiment that a conventional Hartley oscillator will operate best by reason of its inherent quality of starting its sinusoidal output signal at precisely the instant the gating pulse is impressed thereupon.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In combination, a trigger source, a first blocking oscillator coupled to said trigger source and having first and second output circuits, a gate pulse generator coupled to said first output circuit of said first blocking oscillator, a sinusoidal-signal producing oscillator coupled to said gate pulse generator, a shaper coupled to said sinusoidal-signal producing oscillator, a delay means coupled to said second output circuit of said first blocking oscillator, a second blocking oscillator coupled to said delay means, a unistable multivibrator having an input circuit coupled to said second blocking oscillator and first and second output circuits, said first output circuit of said unistable multivibrator being coupled to said shaper, at least one counting unit means coupled to said shaper and responsive to signals therefrom for presenting a visual display representing the delay introduced by said delay means, and a reset device intercoupling said second output circuit of said unistable multivibrator and said counting unit.

2. In combination, a trigger source, a first blocking oscillator coupled to said trigger source and having first and second output circuits, a gate pulse generator coupled to said first output circuit of said first blocking oscillator, a sinusoidal-signal producing oscillator coupled to said gate pulse generator, a shaper coupled to said sinusoidal-signal producing oscillator, variable delay means coupled to said second output circuit of said first blocking oscillator, a second blocking oscillator coupled to said variable delay means, a unistable multivibrator having an input circuit coupled to said second blocking oscillator and first and second output circuits, said first output circuit of said unistable multivibrator being coupled to said shaper, at least one counting unit means coupled to said shaper and responsive to signals therefrom for presenting a visual display representing the delay introduced by said delay means, and a reset device intercoupling said second output circuit of said unistable multivibrator and said counting unit.

References Cited in the file of this patent

UNITED STATES PATENTS

| | | |
|---|---|---|
| 2,516,888 | Levy | Aug. 1, 1950 |
| 2,568,724 | Earp et al. | Sept. 25, 1951 |
| 2,589,807 | Higinbotham | Mar. 18, 1952 |
| 2,613,264 | Haynes | Oct. 7, 1952 |
| 2,639,424 | Getting | May 19, 1953 |
| 2,651,204 | Dickinson | Sept. 8, 1953 |
| 2,754,494 | Brown | July 10, 1956 |
| 2,756,741 | Campanella | July 31, 1956 |
| 2,789,267 | Beal et al. | Apr. 16, 1957 |